United States Patent [19]
Takeuchi et al.

[11] Patent Number: 5,904,993
[45] Date of Patent: May 18, 1999

[54] JOINT BODY OF ALUMINUM AND SILICON NITRIDE AND METHOD OF PREPARING THE SAME

[75] Inventors: Hisao Takeuchi; Koichi Sogabe; Takao Nishioka; Takashi Matsuura; Akira Yamakawa, all of Itami, Japan

[73] Assignee: Sumitomo Electric Industries, Ltd., Osaka, Japan

[21] Appl. No.: 08/648,178

[22] PCT Filed: Sep. 20, 1995

[86] PCT No.: PCT/JP95/01870

§ 371 Date: May 21, 1996

§ 102(e) Date: May 21, 1996

[87] PCT Pub. No.: WO96/09266

PCT Pub. Date: Mar. 28, 1996

[30] Foreign Application Priority Data

Sep. 22, 1994 [JP] Japan ................................ 6-228221

[51] Int. Cl.$^6$ .............................. B23B 15/04; B22F 7/00; B23K 1/19

[52] U.S. Cl. ......................... 428/627; 428/621; 428/457; 428/688; 228/121; 228/122.2; 228/234.1; 228/262.1; 228/262.2; 228/262.21; 419/5; 419/8; 156/89.11; 156/89.28

[58] Field of Search .................... 428/457, 688, 428/689, 627, 621; 156/89, 89.11, 89.28; 228/193, 194, 262.5, 234.1, 262.1, 262.2, 262.21, 121, 122.2; 419/5, 8, 9, 10, 13

[56] References Cited

U.S. PATENT DOCUMENTS

| | | | |
|---|---|---|---|
| 4,693,409 | 9/1987 | Mizunoya et al. | 228/122 |
| 5,126,294 | 6/1992 | Hirosaki et al. | 501/97 |
| 5,451,279 | 9/1995 | Kohinata et al. | 156/89 |
| 5,648,028 | 7/1997 | Miyake et al. | 264/647 |

FOREIGN PATENT DOCUMENTS

| | | |
|---|---|---|
| 0153150 | 8/1995 | European Pat. Off. . |
| 2199075 | 6/1982 | Japan . |
| 58-95674 | 6/1983 | Japan . |
| 60-246278 | 5/1984 | Japan . |
| 59-174582 | 10/1984 | Japan . |
| 59-227781 | 12/1984 | Japan . |
| 61-97174 | 5/1986 | Japan . |
| 61-209965 | 9/1986 | Japan . |
| 62-003834 | 1/1987 | Japan . |
| 62-068669 | 3/1987 | Japan . |
| A1 62-64834 | 4/1987 | Japan . |

(List continued on next page.)

OTHER PUBLICATIONS

X. S. Ning, K. Suganuma, T. Okamoto, A. Koreeda, Y. Miyamoto, Interfacial strength and chemistry of additive–free silicon nitride ceramics brazed with aluminium, Journal of Materials Science 24(1989) Aug., No.8, London, GB, pp. 2879–2883.

K. Suganuma et al. Joining of Silicon Nitride to Silicon Nitride and to Invar Alloy Using an Aluminum Interlayer, Journal of Materials Science 22 (1987) pp. 1359–1364.

(List continued on next page.)

*Primary Examiner*—Marion McCamish
*Assistant Examiner*—Cheryl Juska
*Attorney, Agent, or Firm*—W. F. Fasse; W. G. Fasse

[57] ABSTRACT

A joint body in which aluminum and silicon nitride are strongly joined with each other is provided at a low cost, thereby providing a lightweight part which is excellent in sliding property as a mechanical part of an internal combustion engine of an automobile or the like. The joint body includes a base material which is mainly composed of aluminum, and a member consisting of a silicon nitride sintered body which is substantially directly joined to the base material. A powdery or bulky base material (2) mainly composed of aluminum, and a member (1) consisting of a silicon nitride sintered body are charged in a mold and heated under pressurization, thereby joining the same with each other.

20 Claims, 3 Drawing Sheets

FOREIGN PATENT DOCUMENTS

| | | |
|---|---|---|
| 2-263770 | 10/1990 | Japan . |
| 4-144977 | 5/1992 | Japan . |
| 4-295069 | 10/1992 | Japan . |
| 6-066116 | 3/1994 | Japan . |
| 61-172052 | 6/1994 | Japan . |

OTHER PUBLICATIONS

M. Morita et al. Fracture of Silicon Nitride Joined with an Aluminum Braze, Journal of Materials Science 22 (1987) pp. 2778–2782.

X.S. Ning et al. Bond Strength and Interfacial Structure of Silicon Nitride Joints Brazed with Aluminium–Silicon and Aluminium–Magnesium Alloys, Journal of Materials Science 26 (1991) pp. 2050–2056.

JIS R 1601 (Japanese Industrial Standard) 1981; by Jap. Standards Assoc.

Electronic Ceramics (pp. 20–26) published Dec. 1991 with translation of pertinent parts "Special Report: Metallization, Ceramics–Metal Joining Technique ... " by K. Sugenuma.

JOINING INTERFACE BETWEEN $Si_3N_4$ SINTERED BODY HAVING Si NOT BONDED WITH NITROGEN AND Al BASE MATERIAL

JOINT BODY OF ALUMINUM AND SILICON NITRIDE AND METHOD OF PREPARING THE SAME

FIELD OF THE INVENTION

The present invention relates to a joint body of aluminum and silicon nitride and to a method of preparing the same, and more particularly, it relates to a joint body having a base material of aluminum, which has an excellent sliding property and is employable as a machine part, and to a method of preparing the same.

BACKGROUND INFORMATION

In recent years, attention has been drawn to global environmental problems such as those of exhaust gas, disruption of the ozone layer and the like, and it is urgently necessary to improve the energy efficiency of an internal combustion engine in an automobile or the like. One method of improving the energy efficiency that has been studied is lightening of the parts forming the internal combustion engine. Namely, replacement of parts that have generally been prepared from iron group metals with aluminum group parts has been studied.

However, aluminum group materials generally have an inferior sliding property, and hence it is necessary to partially prepare the aluminum group parts from ceramic which has a superior sliding property and which is further superior in wear resistance.

A number of materials are known as ceramics, as shown in Table 1. Silicon nitride is most promising as a material which has an excellent sliding property and comprises necessary characteristics such as strength and toughness as a machine part while maintaining the advantage of being lightweight as an aluminum group material. Therefore, methods of joining aluminum group materials with silicon nitride sintered bodies have been studied in various fields.

TABLE 1

| Material | Specific Gravity | Strength | Toughness | Slidability | Cost |
|---|---|---|---|---|---|
| $Si_3N_4$ | O | O | O | O | O |
| SiC | O | X | X | O | O |
| AlN | O | X | X | X | O |
| $Al_2O_3$ | X | X | X | O | O |
| $ZrO_2$ | X | O | ⊙ | X | O |
| mullite | X | X | O | X | O |
| $B_4C$ | ⊙ | X | X | O | X |

For example, Japanese Patent Laying-Open No. 6-172052 discloses a method of engaging a ceramics part with an aluminum group material. According to such a mechanical joining method, a problem exists in that the joined members can be separated by an external applied load since the joining strength is generally small. Further, there has been a further problem in that a clearance is defined between the engaged portions as the temperature increases due to the difference between the thermal expansion coefficients (that of ceramics is smaller in most case) between the ceramics part and the aluminum group material. As the temperature further increases, the separation is further enlarged, while the ceramics part is displaced with respect to the aluminum group material and positional accuracy cannot be ensured.

In order to solve such problems, formation of chemical bonding between the ceramics and the aluminum group material has been studied. As the most general method of joining ceramics with a metal, there is a method of metallizing a surface of ceramics by the so-called Mo—Mn method and thereafter brazing the same with a brazing material of a noble metal, or a method of performing brazing using a so-called active metal brazing material which is prepared by adding an active metal such as titanium (Ti) to a noble metal brazing material for improving reactivity with ceramics while omitting metallization. Both of these methods cannot be applied to aluminum group materials having low melting points, since it is necessary to perform heating to high temperatures of at least 700° C. On the other hand, joining by using a solder which is melted at a lower temperature is also conceivable. According to this method, however, it is difficult to remove a strong oxide film from a surface of an aluminum group material, and it has been impossible to join ceramics and an aluminum group material with each other.

Due to such a technical background, Japanese Patent Laying-Open No. 61-209965, for example, discloses a method of arranging a metal (Fe, Co, Ni, Pt or the like) having high reactivity on a surface of a silicon nitride sintered body, metallizing the same preferably in a vacuum atmosphere of at least 1200° C., thereafter bringing the same into contact with aluminum or its alloy, and heating and joining the same at a temperature below its eutectic temperature. However, this method disadvantageously leads to increase of the preparation cost since this metallization step includes troublesome treatments such as application of the metal and a high temperature treatment in a vacuum.

As a method of improving wear resistance of a metal surface, ceramic coating by CVD or PVD is conceivable. According to such a method, however, there have been such problems that the coating layer is separated, and that the rigidity of the coating surface is insufficient when a base material is prepared from an aluminum group material.

As hereinabove described, it has been difficult in the prior art to join a member consisting of silicon nitride to a base material or a backing which is mainly composed of aluminum.

SUMMARY OF THE INVENTION

Accordingly, an object of the present invention is to solve the aforementioned problems, as well as to provide a joint body in which a base material mainly composed of aluminum and a member consisting of a silicon nitride sintered body are strongly joined with each other at a low cost.

In the present invention, a joint body of aluminum and silicon nitride, and a method of preparing the same are provided in order to solve the aforementioned problems, as described in the following paragraphs (1) to (20):

(1) The joint body comprises a base material which is mainly composed of aluminum and a member consisting of a silicon nitride sintered body which is substantially directly joined to the base material.

Here, "substantially" means that no intermediate layer is positively introduced between the base material mainly composed of aluminum and the member consisting of a silicon nitride sintered body. For example, a coating layer of another element (Ti, Ni, Fe or the like) or a plate member thereof is not interposed on the interface between the base material and the member. Further, no adhesive or the like is employed at the interface. When a surface oxide layer resulting from a heat treatment of the silicon nitride sintered body is present on the interface, however, the base material and the member are regarded as being substantially directly joined with each other.

(2) The base material is made of a pure aluminum metal, an aluminum alloy, or an aluminum group composite material (for example, a material reinforced with whiskers, a material in which ceramic is dispersed, or the like).

(3) On the other hand, a silicon nitride sintered body containing silicon (Si) which is not bonded with nitrogen (N) may be employed as the overall sintered body forming the member, depending on the application of the joint body according to the present invention.

(4) The interface at which the base material mainly composed of aluminum and the member consisting of a silicon nitride sintered body are substantially directly joined with each other consists of a layer containing oxygen which is mainly bonded with silicon (Si).

(5) Particularly when the silicon nitride sintered body of the above paragraph (3) is employed, a layer containing silicon (Si) or a silicon (Si) compound is formed in the vicinity of the joining interface between the base material and member, since silicon (Si) is diffused on the aluminum side.

In order to prepare the aforementioned joint body of the present invention, a preparation method according to the following para graphs (6) to (15) is employed:

(6) A powdery or bulky base material which is mainly composed of aluminum and a member consisting of a silicon nitride sintered body are charged or placed in a mold and heated under pressurization, thereby joining the base material and the member with each other.

(7) The mold preferably has a thermal expansion coefficient of at least 0 and not more than $7 \times 10^{-6} K^{-1}$.

A material having a thermal expansion coefficient of 0 includes a C—C composite. In this case, the thermal expansion coefficient is substantially zeroed in specific crystal orientations in the is C—C composite, and it is possible to design the mold making the best use of this directivity.

(8) The mold preferably has a shape which is close to the finished shape of a final product as needed.

(9) As to the material for the mold, it is preferable to employ a mold having electrical conductivity allowing rapid heating by energization. Here, conductivity means exhibiting no insulation property as a principal characteristic, and preferably having a resistivity of not more than $10^3$ Ω. cm.

(10) While joining is performed with the aforementioned mold, it is preferable to prepare a number of molds, simultaneously perform treatments of a number of sets of base materials and members, and continuously carry out a cycle of supply to the molds, joining and removal of the parts in a constant rhythm as a production system of the joining, in order to improve productivity. It is also possible to combine these in response to the situation. Namely, a joining mold or a joining holder capable of simultaneously treating a plurality of sets of base materials and members may be employed.

As heating conditions for the joining, the following are preferable:

(11) As to the heating time, a holding time at the maximum temperature is preferably set within 10 minutes. Further, the temperature of heating is preferably set at 500 to 800° C. The following methods are preferable as the heating system:

(12) A heating method utilizing a plasma.

(13) A method of heating by an induced current.

(14) A method of heating by a microwave.

(15) In case of employing the heating means of the above items (13) or (14), it is more preferable to heat only the base material mainly composed of aluminum in particular.

In the aforementioned heating means of the above items (12) to (14), the heating is performed by energizing both or either of the joined bodies and causing an energization current to flow.

Another method of preparing the joint body of the above paragraphs (1) to (5), is characterized by the following paragraph (16).

(16) The base material mainly composed of aluminum and the member consisting of a silicon nitride sintered body are arranged in a joining mold or a joining holder, so that sintering of the base material and joining of the base material and the member are simultaneously performed by hot forging. As to a form of the base material mainly composed of aluminum which is supplied into the mold in this case, a powder or a powder compact is employed. The forging temperature is preferably set at 550 to 650° C.

Further, the following preparation method can be listed in addition to the aforementioned forging:

(17) It is also possible to arrange the member consisting of a silicon nitride sintered body in a joining mold or a joining holder and to supply the base material mainly composed aluminum into the joining mold or the joining holder in the form of a molten metal, for simultaneously performing molding and joining.

As described above, first there is the preparation method according to the above paragraph (6) as a method of preparing the joint according to the above paragraphs (1) to (5), there are the features according to the above paragraphs (7) to (15) as means therefor, and there are the methods according to the above paragraphs (16) and (17) as other methods for similarly preparing the joint body according to the above paragraphs (1) to (5).

In the present invention, further, it is proper to employ a member according to the following paragraph (18) separately from the member according to the above paragraph (3) as the member consisting of a silicon nitride sintered body which is supplied for carrying out the preparation methods of above paragraphs (6), (16) and (17):

(18) A member obtained by previously heat treating a silicon nitride sintered body at a temperature of at least 800° C and not more than 1200° C. is employed according to this alternative. It is assumed that the atmosphere of the heat treatment is an atmosphere containing inert gas or oxygen gas, or a vacuum.

(19) In this case, the heat treatment is preferably performed in an atmosphere containing oxygen in particular.

(20) A silicon nitride sintered body having an as sintered surface is employed as such without subsequent machining.

The joint body according to the present invention is formed by a base material mainly composed of aluminum and a member consisting of a silicon nitride sintered body which is substantially directly joined to the base material as described in the above paragraph (1), dissimilarly to a conventional joint body of generally a similar combination. In the joint body of the present invention, the base material and the member are directly joined with each other, whereby preparation of an intermediate layer, an operation of inserting the intermediate layer and the like can be omitted, and reduction of the preparation cost can be attained. Since the base material and the member are directly joined with each other, further, deterioration of the characteristics of the base material and of the member on the joining interface, caused by the intermediate layer, and occurrence of joining defects on the interface can be avoided. Thus, according to the joint body of the present invention, a complex of aluminum and silicon nitride having higher reliability can be provided.

Various materials can be used for the joined base material, in response to changes of the application and use conditions. Among these materials, a pure aluminum metal, an aluminum alloy or an aluminum group composite material is mainly employed as the material mainly composed of aluminum, as described in the above paragraph (2).

The reasons for particularly employing the aluminum group composite material among these materials are enumerated as follows:

For example, an aluminum group composite material containing silicon (Si) is employed in case of requiring higher rigidity and wear resistance. On the other hand, an aluminum group composite material in which whiskers of a metal or ceramics are dispersed is employed in case of requiring higher strength and toughness. Further, an aluminum group composite material in which ceramic hard grains are dispersed is employed in case of requiring wear resistance.

An ingot material or a material which is prepared by powder metallurgy is employed as the base material. Selection of a method of preparing such a base material is properly performed in response to changes of the application and use conditions.

The silicon nitride sintered body forming the member in the joint body according to the present invention can also be properly selected in response to the application.

First, a silicon nitride sintered body obtained by performing nitriding reaction sintering from the so-called raw material mainly composed of silicon, in which the overall sintered body partially contains silicon (Si) that is not bonded with nitrogen (N) as described in the above paragraph (3), is used in order to increase joining strength.

Figure 3:
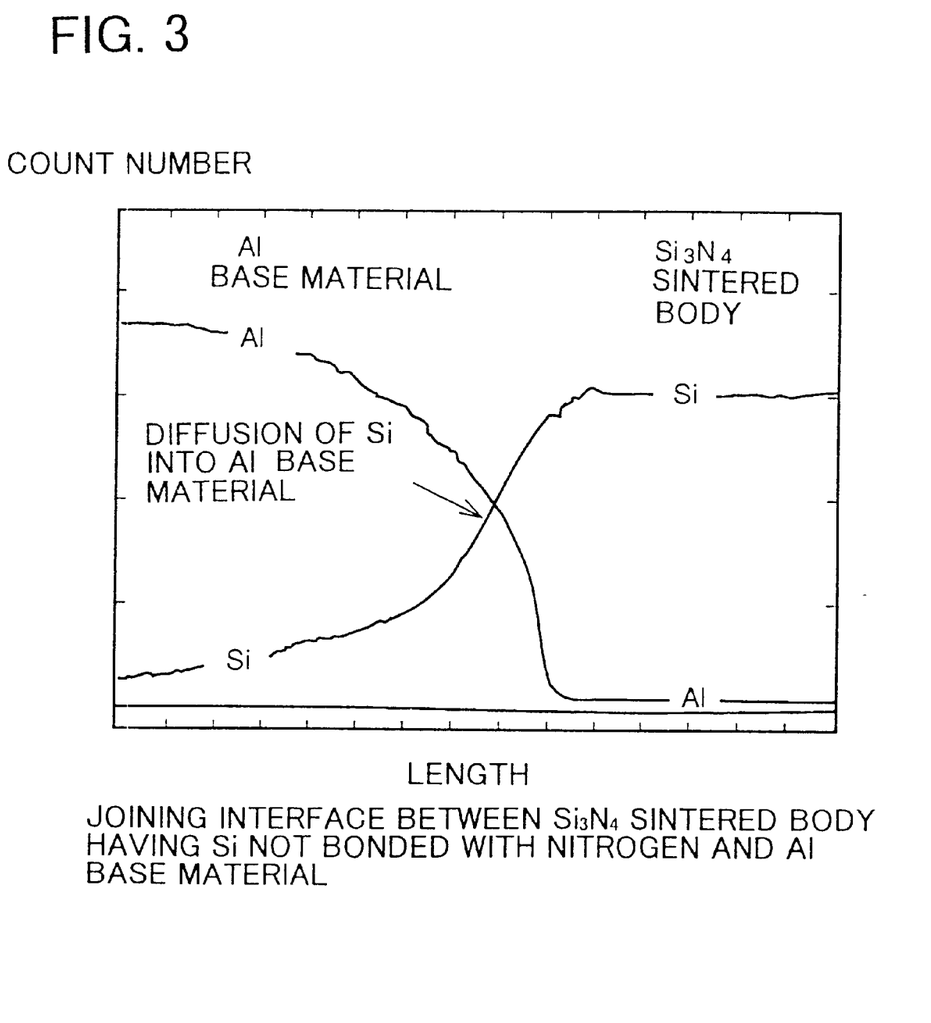
FIG. 3 is a diagram showing an analytical result of the element distribution in and across a joining interface in a joint body according to another Example of the present invention.

When such a silicon nitride sintered body is employed, a layer containing silicon (Si) or a silicon (Si) compound is formed in the vicinity of the joining interface by pressurization heating joining of the base material and the member, as described in the above paragraph (5). Thus, the joining strength of the joining interface is improved. FIG. 3 shows an example of an elemental analysis result of a section in this case, as explained in Example 7 described later.

Figure 2:
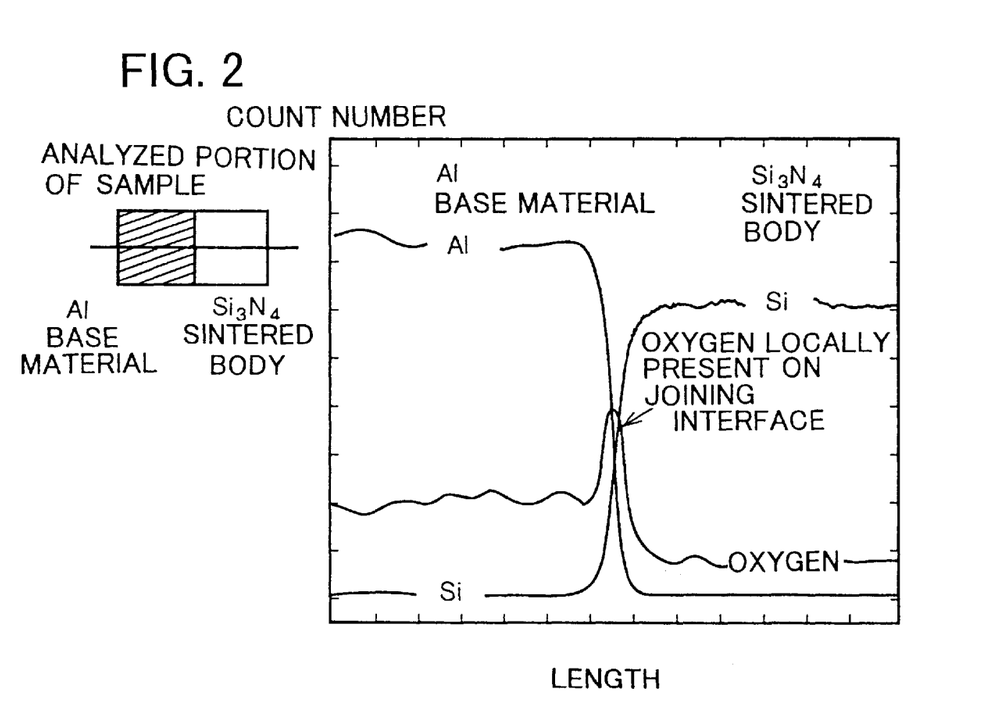
FIG. 2 is a diagram showing an analytical result of the element distribution in and across a joining interface in a joint body according to the present invention.

In order to improve the joining strength, further, the joining interface may be formed by a layer containing oxygen (O) which is mainly bonded with silicon (Si), as described in the above paragraph (4). It is understood that oxygen is locally present on the joining interface when oxygen is present in a portion on the side of the base material mainly composed of aluminum or on the side of the member consisting of a silicon nitride sintered body forming the interface in this case, as demonstrated in an elemental analysis result of a section which is shown in FIG. 2 and explained in Example 3 described later. Thus, the joining strength of the joining interface is improved.

While it is conceivable that the joining interface in which oxygen is locally present is formed as shown in FIG. 2 as a result of oxygen being supplied from a surface on the side of the base material mainly composed of aluminum, it is preferential that it results from oxygen being supplied from a surface of the member consisting of a silicon nitride sintered body.

When a silicon nitride sintered body which is obtained by nitriding reaction sintering is employed as the base material as hereinabove described, the joining strength is further increased as compared with the case of employing some other silicon nitride sintered body, since a diffusion layer containing silicon or a silicon compound is formed on the joining interface.

Such a reaction-sintered silicon nitride sintered body, however, merely, has a bending strength of about 600 MPa in the ordinary case. In an application requiring higher bending strength, therefore, the joint body of the present invention having such a sintered body cannot be utilized even if the joining strength is high.

In applications requiring high strength, therefore, a silicon nitride sintered body that does not contain silicon that is not bonded with nitrogen is employed for the member of the inventive joint body. It is preferable to employ a silicon nitride sintered body having a bending strength of at least 1200 MPa at room temperature, when the same is to be employed under severe conditions requiring high wear resistance, bending strength and fatigue characteristics in particular.

The method of preparing the joint body according to the present invention is now described.

As described in the above paragraph (6), the base material mainly composed of aluminum and the member consisting of a silicon nitride sintered body are charged in the mold and heated under pressurization, so that these two parts are joined with each other.

The material forming the base material mainly composed of aluminum may be either powdery or bulky. As to this selection, the most appropriate low-priced supply form may be considered depending on the type of the material forming the base material.

When the material forming the base material is an ingot material, for example, a bulky one is employed. In case of employing an aluminum-silicon alloy having a silicon content of at least 20 weight % as the base material, it is economically advantageous to prepare the same in the form of atomized powder. In case of employing an aluminum group composite material in which whiskers are dispersed or an aluminum group composite material in which grains of hard ceramics are dispersed as the material for the base material, the respective raw material may be supplied in a form to be sintered simultaneously with joining, or a bulky material may be previously formed and thereafter supplied into the mold.

The silicon nitride sintered body is previously arranged in the joining mold, thereafter the base material mainly composed of aluminum is charged in the mold in any one of the aforementioned forms, and pressurized and heat treated under conditions for obtaining a joint body having characteristics in consideration of a desired shape and application, so that the base material and the member are joined with each other.

As to the mold employed in the preparation method of the present invention, the thermal expansion coefficient of the mold is preferably at least 0 and not more than $7 \times 10^{-6} K^{-1}$, as described in the above paragraph (7). When a mold having a thermal expansion coefficient of less than 0 (i.e., negative) is employed, the mold may be broken by expansion of the silicon nitride sintered body during heating.

If the thermal expansion coefficient of the mold exceeds $7 \times 10^{-6} K^{-1}$, on the other hand, it may be difficult to remove the joint body or the mold may be damaged by removal of the joint body since the mold contracts when the same is cooled after joining.

As to the shape of the mold, further, the working margin in later working can be reduced by employing a mold having a shape which is close to the shape of a final product as described in the above paragraph (8), whereby the preparation yield can be improved. Depending on the application, further, the later working can be omitted if the dimensional accuracy of the prepared joint body is within a desired range.

It is not necessarily an indispensable condition that the mold has conductivity, depending on the heating system. In an external heating system for heating the mold from its outer periphery, for example, it is not necessary to employ a conductive mold (for example, a semiconductor or a conductor having resistivity of not more than $10^3$ Ω.cm). In the external heating system, the member consisting of a silicon nitride sintered body and the base material mainly composed of aluminum are directly joined with each other regardless of conductivity of the mold, and a joint body having prescribed joining strength can be obtained.

The heating time is not necessarily restricted either, if the base material and the member are similarly directly joined with each other and prescribed joining strength is attained.

As a more preferable method of producing the inventive joint body with a high efficiency at a low cost, however, it is necessary to employ the joining mold having conductivity which is described in the above paragraph (9), in order to carry out a joining method with a holding time of within 10 minutes at the maximum temperature described in the above paragraph (11), i.e., a preparation method having high productivity, by any one of the systems including plasma heating, induced current heating and microwave heating described in the above paragraphs (12) to (14).

In the method of preparing a joint body according to the present invention, it is preferable to employ a mass production system in coincidence with a joining lead time while properly controlling the same in connection with precedent and subsequent steps as described in the above paragraph (10), in order to attain high productivity. Particularly when a conductive mold is used and heating means using any of plasma heating, induced current heating and microwave heating having high efficiency is employed, it is possible to form the aforementioned production system also achieving the condition that the maximum holding time is within 10 minutes.

The heating temperature is preferably at least 500° C. and not more than 800° C. This is because shape working of the heated base material mainly composed of aluminum is difficult if the temperature is less than 500° C. This is also because aluminum is evaporated to cause modification or a defect of the base material if the temperature is at least the melting temperature of aluminum and exceeds 800° C.

In case of preparing the joint body with a heating/holding time within 10 minutes with a conductive mold, the systems of the aforementioned paragraphs (12) to (14) can be employed as the heating means.

In the plasma heating, a plasma is generated on the joining interface by energization, and cleaning of the surface is performed. Thus, a dense diffusion layer of silicon or a localized layer of oxygen can be formed in a short time.

In the induction heating, either heating of the overall mold or heating of only the joined materials can be achieved as desired through selection of the type of the mold. Also in the induction heating, a dense joining interface can be formed in a short time similarly to the plasma heating.

The microwave heating can also attain an effect similar to that of the induction heating.

In the aforementioned heating system, it is preferable to heat only the base material mainly composed of aluminum which is a conductive joined portion, as described in the above paragraph (15). According to such heating, more rapid heating with excellent thermal efficiency can be performed.

While the preparation method described above is a method of arranging the member and the base material in the joining mold and heating and pressurizing the same, it is also possible to join the same by hot forging as described in the above paragraph (16). The forging temperature in this case is preferably at least 550° C. and not more than 650° C. If the temperature is less than 550° C., densification by plastic deformation of the base material mainly composed of aluminum itself is difficult. If the temperature exceeds 650° C., softening of the base material mainly composed of aluminum so intensifies that shape accuracy is deteriorated.

Alternatively to the aforementioned preparation method, it is further possible to use a method of arranging a silicon nitride sintered body in a joining mold or a joining holder and casting the same while supplying the member mainly composed of aluminum in the form of a molten metal for molding the same simultaneously with joining, as described in the above paragraph (17). In this case, a holding time of the casting and a cooling time are properly controlled by employing the aforementioned various silicon nitride sintered bodies or a previously pretreated silicon nitride sintered body. Thus, it is possible to obtain a joint body in which the base material mainly composed of aluminum and the silicon nitride sintered body are directly joined with each other on the joining interface.

In order to improve the strength of the joining interface of the inventive joint body, further, the following treatment is previously performed on the silicon nitride sintered body:

As described in the above paragraph (18), the silicon nitride sintered body is heat treated at a temperature of at least 800° C. and not more than 1200° C. so that its surface is previously modified, before the member consisting of the silicon nitride sintered body is joined to the base material mainly composed of aluminum.

In the joint body according to the present invention, a layer in which at least oxygen is localized is formed on the joining interface as described above. This oxygen component may be supplied from the surface on the side of the base material mainly composed of aluminum as described above, but the main part thereof is supplied from the surface of the member consisting of the silicon nitride sintered body. The heat treatment described in the above paragraph (18) is performed as a means for sufficiently ensuring the oxygen quantity of the oxygen localized layer.

When this heat treatment is performed, the joining strength can be improved as compared with that of an untreated one. This is because a component of a sintering aid mainly composed of an oxide on its surface rises to and accumulates on the joining surface of the silicon nitride sintered body, to form a surface which is rich in the oxygen component.

As described in the above paragraph (19), further, silicon dioxide ($SiO_2$) can be positively formed on the surface of the joining interface by using an oxygen-containing atmosphere for the heat treatment.

The temperature is at least 800° C. and not more than 1200° C. in the aforementioned heat treatment since oxidization of silicon nitride does not proceed if the temperature is less than 800° C., while surface oxidation of silicon nitride excessively proceeds and the characteristics of silicon nitride are deteriorated if the temperature exceeds 1200° C.

According to a first method, the joining surface of the member consisting of a silicon nitride sintered body is finished or machined before joining as described in the above paragraph (20). According to an alternative method, the member may be prepared in a state of an as-sintered surface i.e., in an unmachined state, if it is not necessary to finish the surface of the sintered body. Thus, the preparation cost can be reduced. The heat treatment described in the above paragraphs (18) or (19) may be previously performed on the silicon nitride sintered body having this as-sintered surface.

DETAILED DESCRIPTION OF PREFERRED EMBODIMENTS OF THE INVENTION

While Examples of the present invention are now described, the present invention is not in any way restricted by these Examples.

Example 1

Figure 1:
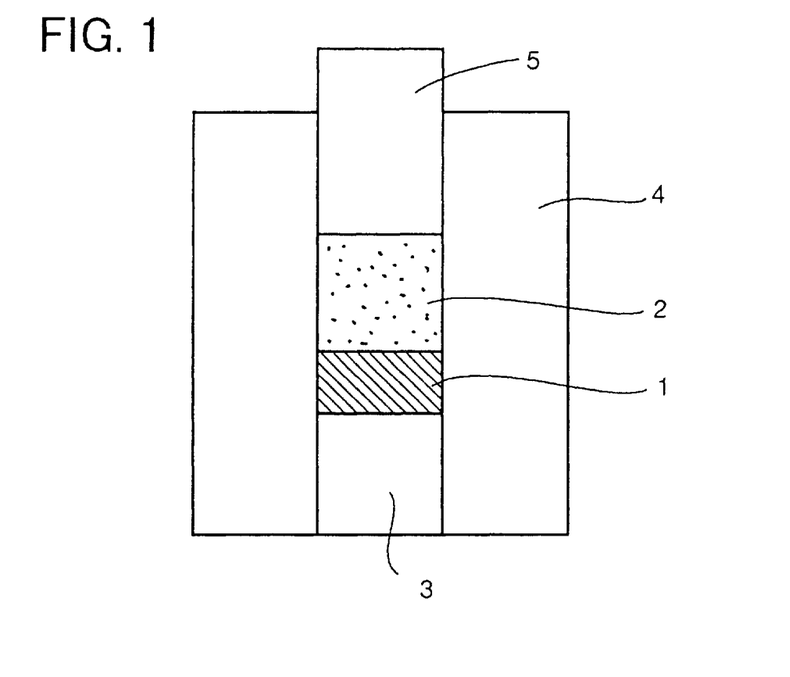
FIG. 1 is a sectional view showing an example of a joining mold employed in an Example of the present invention.

A silicon nitride sintered body consisting of a rectangular parallelopiped having dimensions of 6 mm×6 mm×3 mm, and aluminum powder 99% in purity were set in a mold of carbon as shown in FIG. 1 and more specifically described below. A square surface of 6 mm×6 mm was employed as a joining surface. The silicon nitride sintered body was prepared with addition of $Y_2O_3$ of 5 weight %—$Al_2O_3$ of 3 weight % as a sintering aid. Bending strength of the silicon nitride sintered body at room temperature was 1300 MPa (three-point bending strength in accordance with JISR1601). The surface of the silicon nitride sintered body was ground.

The silicon nitride sintered body and the aluminum powder were charged into the mold as shown in FIG. 1. The silicon nitride sintered body 1 was set on a mold 3 which was arranged in a carbon mold 4. The aluminum powder 2 was charged on this silicon nitride sintered body 1. A carbon rod 5 was placed on the aluminum powder 2.

The charging height of the aluminum powder in the mold 4 was 18 mm. This mold 4 of carbon was set in a furnace capable of mechanical pressurization and rapid heating with a pulsative current, heated to 670° C. in a vacuum with application of a load of 200 kg, and held for 2 minutes. The temperature rise time was 4 minutes, and the cooling time was 15 minutes. The pulsative current was employed for generating a plasma. While a slight amount of aluminum believed to have been melted was recognized in the clearance between the mold 4 of carbon and the rod 5 of carbon, most aluminum remained, and a joint body of silicon nitride and aluminum was obtained.

The side surface of the joint body was ground to remove aluminum adhering to the side surface, thereby preparing a test piece for measurement of shearing strength. No crack resulting from thermal stress, which is generally recognized in conventional joining, was recognized on the joint body.

An aluminum portion of this joint body was fixed to measure shearing strength, which was determined to be 210 MPa, whereby it has been proved that excellent joining is achieved.

Example 2

Joining and evaluation were performed in a method similar to Example 1, except that an aluminum bulk (99% in purity) in the form of a cube measuring 6 mm on each side was employed in place of the aluminum powder in Example 1. An excellent joint body was similarly obtained, and its shearing strength was 170 MPa.

Example 3

Samples of the silicon nitride sintered body obtained in Example 1, after grinding, were heat treated under conditions (atmospheres and temperatures) shown in Table 2 for 1 hour in Example 1, and joining and evaluation were performed under conditions similar to those of Example 1, to obtain results shown in Table 2. The pressure of the vacuum atmosphere was $10^{-2}$ Torr, while the atmospheres of other gases were set at 1 atm.

TABLE 2

| Heat Treatment | | | Result |
|---|---|---|---|
| Atmosphere | Temperature (° C.) | Crack | Shearing Strength (MPa) |
| | untreated | no | 170 |
| vacuum | 1100 | no | 190 |
| argon | 1200 | no | 180 |
| nitrogen | 700 | no | 170 |
| nitrogen | 800 | no | 180 |
| nitrogen | 900 | no | 200 |
| nitrogen | 1000 | no | 220 |
| nitrogen | 1100 | no | 230 |
| nitrogen | 1200 | no | 210 |
| nitrogen | 1300 | no | 170 |
| atmosphere | 700 | no | 180 |
| atmosphere | 800 | no | 250 |
| atmosphere | 900 | no | 280 |
| atmosphere | 1000 | no | 290 |
| atmosphere | 1100 | no | 260 |
| atmosphere | 1200 | no | 170 |
| atmosphere | 1300 | no | 120 |

A joint body employing a silicon nitride sintered body which was heat treated in the atmosphere at 1000° C. was cut perpendicularly to its joining surface, for investigating the distribution of elements in the vicinity of the joining surface with EPMA. The result is shown in FIG. 2. As shown in FIG. 2, it has been proved that a layer having high oxygen concentration was present on the joining interface.

Example 4

Samples were prepared by heat treating the machined silicon nitride sintered body of Example 1 in the atmosphere at 1000° C. for 1 hour, while rapidly solidified aluminum alloy powder containing silicon by 20 weight % was employed in place of the aluminum powder of 99% in purity. Joining was performed under conditions shown in Table 3. Results of evaluation of the sample joint bodies of silicon nitride and the aluminum alloy thus obtained are also shown in Table 3.

TABLE 3

| Joining Condition | | Result | |
|---|---|---|---|
| Temperature (° C.) | Holding Time (min.) | Crack | Shearing Strength (MPa) |
| 400 | 2 | no | not joined |
| 500 | 2 | no | 150 |

TABLE 3-continued

| Joining Condition | | Result | |
|---|---|---|---|
| Temperature (° C.) | Holding Time (min.) | Crack | Shearing Strength (MPa) |
| 550 | 2 | no | 170 |
| 600 | 2 | no | 200 |
| 660 | 2 | no | 330 |
| 700 | 2 | no | 310 |
| 660 | 1 | no | 300 |
| 660 | 3 | no | 350 |
| 660 | 5 | no | 320 |
| 660 | 10 | no | 260 |
| 660 | 20 | no | 220 |

Example 5

An as-sintered sample was employed in place of the heat treated silicon nitride sintered body in Example 4, and joining and evaluation were performed under conditions similar to those of Example 1. An excellent joint body was obtained, and its joining strength was 180 MPa.

Example 6

The heat treated silicon nitride sintered bodies and the aluminum alloy powder employed in Example 4 were set in molds of materials shown in Table 4. These were joined by heating methods and under joining conditions (temperatures and applied loads) shown in Table 4, and evaluation thereof was performed. The results of the evaluation are shown in Table 4. In order to prevent adhesion of the molds and the samples, the inner walls of the molds were wrapped up or covered with sheets of carbon before charging the samples therein.

TABLE 4

| | | Joining Condition | | | Result | |
|---|---|---|---|---|---|---|
| Mold Material | Heating Method | Temp- erature (° C.) | Load (kg) | Holding Time (min.) | Crack | Shearing Strength (MPa) |
| WC | high frequency induction | 680 | 200 | 2 | no | 320 |
| $Si_3N_4$ | high frequency induction | 680 | 200 | 2 | no | 330 |
| C | dc energi- zation | 680 | 200 | 2 | no | 260 |
| steel | dc energi- zation | 680 | 200 | 2 | no | 280 |
| $Si_3N_4$ | micro- wave | 680 | 200 | 2 | no | 320 |

It is estimated that the heating was performed by induction heating of aluminum in the case of using the mold of silicon nitride in an induction furnace among the combinations of the mold materials and the heating methods shown in Table 4. When a mold of steel having a high thermal expansion coefficient was used, it was difficult to take out the joint body due to mold contraction after cooling.

Example 7

A silicon nitride sintered body having a bending strength of 550 MPa and containing 2 weight % of silicon that was not bonded with nitrogen was employed in place of the silicon nitride sintered body in Example 1, and a joint body was prepared under the same conditions as those of Example 1. However, the cooling time was set at 1 hour, in consideration of relaxation of thermal stress. No crack was observed in the obtained joint body, and its joining strength was 210 MPa.

A sample of the obtained joint body was cut perpendicularly to its joining surface, and the element distribution around the joining surface was measured. As shown in FIG. 3, a region in which silicon was gradually diffused toward the aluminum side was recognized, and it is estimated that this contributed to improvement of the joining strength.

Example 8

The silicon nitride sintered body heat treated in the atmosphere at 1000° C. for 1 hour, which was employed in Example 3, and aluminum powder of 99% in purity were set in a mold of alumina, in the manner as shown in FIG. 1. In order to prevent adhesion of the mold and the sample, a carbon sheet was interposed between the mold and the sample. This mold was set in a so-called hot press furnace having a carbon heater (external heating type), and heated to 660° C. with application of a load of 200 kg in a vacuum. The time required for temperature rise was 30 minutes. Holding times were set at 5 minutes, 20 minutes and 60 minutes. After cooling, a joint body having no defect such as a crack was obtained. Shearing strength values similar to that in Example 1 were measured, which were 310 MPa, 200 MPa and 150 MPa respectively with respect to the holding times.

Example 9

Figure 4:
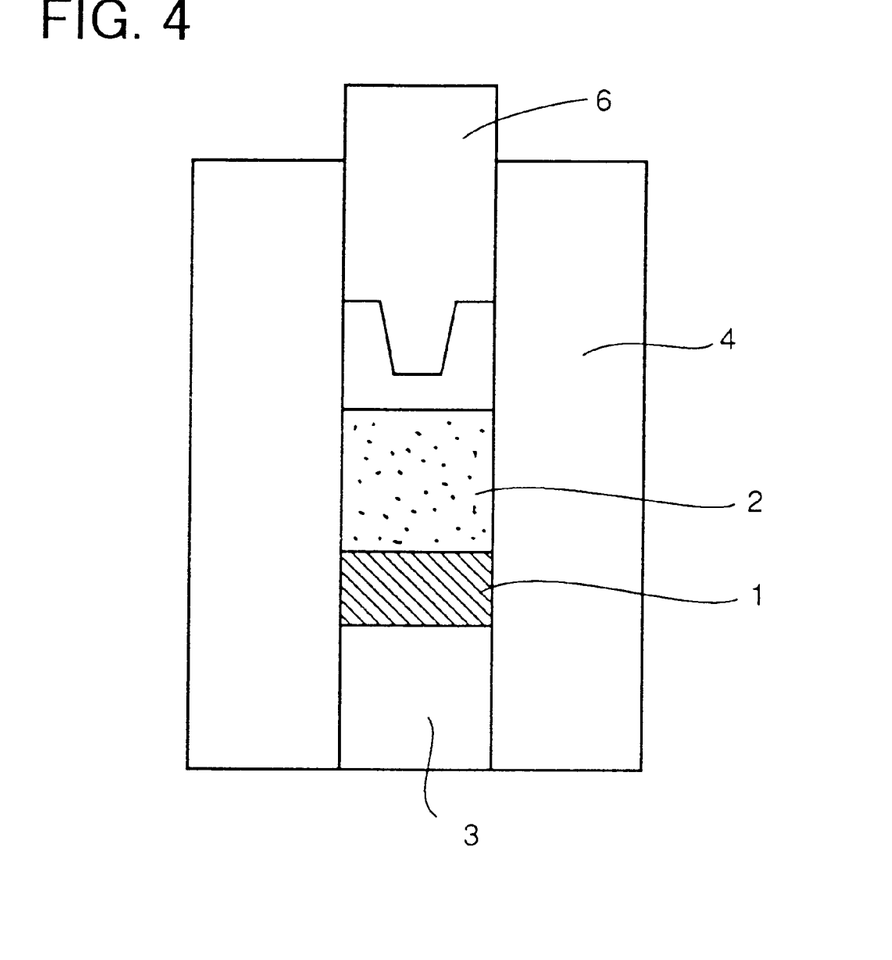
FIG. 4 is a sectional view showing another embodiment of a mold employed for preparing the inventive joint body.

A sample of a silicon nitride sintered body 1 which was prepared by grinding the same material as the silicon nitride sintered body employed in Example 1 into a shape of 25 mm in diameter and 3 mm in thickness and thereafter heat treating the same in the atmosphere at 900° C. for 1 hour, and rapidly solidified aluminum alloy powder 2 containing silicon by 25 weight % were set on a mold block 3 in a mold 4 as shown in FIG. 4. As shown in FIG. 4, these were heated by a pulsative current in an argon atmosphere with application of a load of 5 tons with a rod 6 of carbon having a convex shape, and held for 2 minutes. Holding temperatures were set at 620° C. and 680° C.

Figure 5:
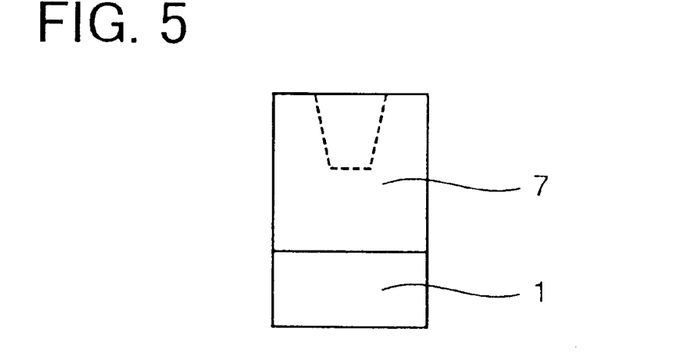
FIG. 5 is a diagram showing a joint body obtained through the joining mold shown in FIG. 4.

A joint body of a shape shown in FIG. 5 was obtained at either holding temperature. As shown in FIG. 5, the aluminum alloy 7 is joined to the silicon nitride sintered body 1. No defect such as a crack was observed in the joint body.

Example 10

A mold of carbon having three holes therein capable of simultaneously receiving three samples of the same shape as in Example 9 was used to simultaneously perform joining using three rods of carbon having the same shape. Joining conditions were identical to those in Example 9, except that the applied load was changed to 15 tons. Three excellent joint bodies were simultaneously obtained.

Example 11

A sample of a silicon nitride sintered body which was prepared by grinding the same material as the silicon nitride sintered body employed in Example 1 into a rectangular parallelopiped having dimensions of 15 mm×15 mm×3 mm and thereafter heat treating the same in the atmosphere at 900° C. for 1 hour was set in a mold of carbon having the shape of a rocker arm of an automobile engine. The mold was preheated to 300° C., and thereafter a molten metal of an aluminum alloy containing silicon by 15 weight % was fed from an upper portion of the mold and pressurized at 5 atm. until the same was solidified. The sample was taken out by decomposing the mold, whereby a rocker arm in which the silicon nitride sintered body was joined to a sliding part was obtained. A sample of the same shape as Example 1 was prepared by the same method and subjected to measurement of shearing strength, which was 320 MPa.

The obtained rocker arm was employed to perform an engine rotation test. An acceleration test under high speed rotation was executed for 120 hours using a lubrication oil containing soot therein. In the rocker arm after the test, no breakage was observed in the joined part and other portions. Abrasion loss of the sliding surface was 5 μm. In a conventional rocker arm having a sliding surface made of a sintered alloy (Cr—Mo steel), which is mainly employed at present, abrasion loss of 150 μm has been observed under the same conditions as the above. Therefore, it is understood that wear resistance is remarkably improved in a rocker arm which is prepared from the inventive joint body.

Example 12

The silicon nitride sintered body employed in Example 9 and a rapidly solidified aluminum alloy powder compact (65% in relative density and 20 mm in height) containing silicon by 25 weight % were set in a forging mold of steel as shown in FIG. 1. These were forged at a temperature of 580° C. with a load of 40 tons, whereby an excellent joint body was obtained.

Example 13

The silicon nitride sintered body employed in Example 9 and each aluminum group composite material shown in Table 5 were set in a mold of silicon carbide as shown in FIG. 1, heated to 610° C. by a pulsative current with application of a load of 10 tons in a vacuum, and held for 5 minutes. The aluminum group composite material had a dimensional shape of 25 mm in diameter and 6 mm in thickness in each case. Whichever aluminum group composite material shown in Table 5 was employed, an excellent joint body was obtained. Samples having sectional shapes of 6 mm×6 mm were cut out from the obtained joint bodies and subjected to measurement of shearing strength, whereby the results shown in Table 5 were obtained.

TABLE 5

| Material | Result | |
|---|---|---|
| | Crack | Shearing Strength (MPa) |
| Al - 10% SiC grain | no | 250 |
| Al - 20% SiC grain | no | 260 |
| Al - 10% SiC whisker | no | 300 |
| Al - 20% SiC whisker | no | 290 |
| Al - 20% $Si_3N_4$ whisker | no | 310 |

According to the present invention, as hereinabove described, a joint body in which aluminum and silicon nitride are strongly joined with each other can be provided at a low cost, whereby the present invention can be advantageously applied to a lightweight part which is excellent in sliding property as a mechanical part of an internal combustion engine of an automobile or the like.

We claim:

1. A joint body of aluminum and silicon nitride comprising:
    a base material containing aluminum as a main constituent; and
    a member consisting of a silicon nitride sintered body that is substantially directly joined to said base material along a joining interface therebetween;
    wherein said joining interface between said base material and said member consists of a layer containing oxygen (O) and silicon (Si), and said oxygen is locally present in said joining interface for increasing a joint strength between said base material and said sintered body.

2. The joint body in accordance with claim 1, wherein said base material consists of at least one material selected from the group consisting of pure aluminum, aluminum alloys and composite materials containing aluminum as a main constituent.

3. The joint body in accordance with claim 1, further comprising a layer containing silicon (Si) or a silicon (Si) compound adjacent to said joining interface.

4. The joint body in accordance with claim 3, wherein said layer containing silicon or a silicon compound is a diffusion layer in said base material adjacent to said joining interface, wherein said diffusion layer comprises silicon that has diffused from said silicon nitride sintered body into said base material.

5. The joint body in accordance with claim 1, wherein said layer further contains aluminum, and wherein a content of said oxygen predominates over a content of said aluminum and over a content of said silicon in said layer at least at a plane of greatest oxygen concentration.

6. A method of preparing a joint body of aluminum and silicon nitride including a base material containing aluminum as a main constituent, and a member consisting of a silicon nitride sintered body that is substantially directly joined to said base material along a joining interface therebetween, wherein said joining interface between said base material and said member consists of a layer containing oxygen (O) and silicon (Si), and said oxygen is locally present in said joining interface for increasing a joint strength between said base material and said sintered body, wherein the method comprises the following steps:
    oxidizing a silicon nitride sintered body by heating said body in an oxygen-containing atmosphere at a temperature of at least 800° C. and not more than 1200° C.,
    charging a powdery or bulky base material containing aluminum as a main constituent, and said oxidized silicon nitride sintered body into a mold, and
    heating and pressurizing said base material and said sintered body in said mold, at a temperature of at least 500° C. and not more than 800° C., thereby joining said base material and said sintered body with each other.

7. The method of preparing a joint body in accordance with claim 6, wherein said mold has a thermal expansion coefficient of at least 0 and not more than $7 \times 10^{-6} K^{-1}$.

8. The method of preparing a joint body in accordance with claim 6, wherein said mold has a shape at least approximating a final shape of a final product to be produced from said base material and said sintered body joined with each other.

9. The method of preparing a joint body in accordance with claim 6, wherein said mold has electrical conductivity.

10. The method of preparing a joint body in accordance with claim 6, wherein said mold includes a joining mold or a joining holder adapted to simultaneously receive therein a plurality of sets of said base materials and said sintered bodies.

11. The method of preparing a joint body in accordance with claim 6, wherein said step of heating and pressurizing is carried out to achieve and maintain a maximum temperature for a holding time of not more than 10 minutes.

12. The method of preparing a joint body in accordance with claim 11, wherein said heating in said step of heating and pressurizing is performed using a plasma.

13. The method of preparing a joint body in accordance with claim 11, wherein said heating in said step of heating and pressurizing is performed using an induced current.

14. The method of preparing a joint body in accordance with claim 11, wherein said heating in said step of heating and pressurizing is performed using a microwave.

15. The method of preparing a joint body in accordance with claim 13, wherein said heating in said step of heating and pressurizing is carried out so as to apply heat only to said base material using said induced current.

16. The method of preparing a joint body in accordance with claim 6, wherein said silicon nitride sintered body that is charged into said mold has an oxidized surface used as-is without any surface machining after said oxidizing step.

17. The method of preparing a joint body in accordance with claim 6, further comprising a preliminary step of preparing said silicon nitride sintered body by nitriding reaction sintering a raw material containing silicon as a main constituent.

18. The method of preparing a joint body in accordance with claim 6, wherein said step of heating and pressurizing is carried out at a temperature not greater than 660° C.

19. The method of preparing a joint body in accordance with claim 18, wherein said heating and pressurizing comprises maintaining said temperature for a time in a range from 1 minute to 5 minutes.

20. A method of preparing a joint body of aluminum and silicon nitride including a base material containing aluminum as a main constituent, and a member consisting of a silicon nitride sintered body that is substantially directly joined to said base material along a joining interface therebetween, wherein said joining interface between said base material and said member consists of a layer containing oxygen (O) and silicon (Si), and said oxygen is locally present in said joining interface for increasing a joint strength between said base material and said sintered body, wherein the method comprises the following steps:

oxidizing a silicon nitride sintered body by heating said body in an oxygen-containing atmosphere at a temperature of at least 800° C. and not more than 1200° C., arranging a base material containing aluminum as a main constituent, and said oxidized silicon nitride sintered body in a joining mold or a joining holder, and simultaneously performing sintering of said base material and joining of said base material and said sintered body in said joining mold or joining holder by hot forging.

* * * * *

UNITED STATES PATENT AND TRADEMARK OFFICE
CERTIFICATE OF CORRECTION

PATENT NO. : 5,904,993

DATED : May 18, 1999

INVENTOR(S) : Takeuchi et al.

It is certified that error appears in the above-identified patent and that said Letters Patent is hereby corrected as shown below:

Col. 3,
    line 34, after "the", delete "is".

Col. 4, line 27, after "joint" insert --body--;

Signed and Sealed this

Ninth Day of November, 1999

Q. TODD DICKINSON

*Attest:*

*Attesting Officer*     Acting Commissioner of Patents and Trademarks